US012561118B2

(12) United States Patent
Kamadi et al.

(10) Patent No.: US 12,561,118 B2
(45) Date of Patent: Feb. 24, 2026

(54) SYSTEM AND METHOD FOR AUTOMATED TECHNOLOGY MIGRATION

(71) Applicant: AidenAi, Inc, Princeton, NJ (US)

(72) Inventors: Srinivas Kamadi, Princeton, NJ (US); Rajagopal V S Neralla, Bangalore (IN); Vinoth Nivas Jayaraman, Chennai (IN)

(73) Assignee: AIDENAI, INC, Princeton, NJ (US)

( * ) Notice: Subject to any disclaimer, the term of this patent is extended or adjusted under 35 U.S.C. 154(b) by 0 days.

(21) Appl. No.: 19/199,163

(22) Filed: May 5, 2025

(65) Prior Publication Data

US 2025/0348290 A1 Nov. 13, 2025

Related U.S. Application Data

(60) Provisional application No. 63/645,538, filed on May 10, 2024.

(51) Int. Cl.
*G06F 8/40* (2018.01)
*G06F 8/74* (2018.01)

(52) U.S. Cl.
CPC . *G06F 8/40* (2013.01); *G06F 8/74* (2013.01)

(58) Field of Classification Search
CPC ..................................... G06F 8/40; G06F 8/74
See application file for complete search history.

(56) References Cited

U.S. PATENT DOCUMENTS

| | | | | |
|---|---|---|---|---|
| 7,769,704 | B2 * | 8/2010 | Marfatia | G06F 8/51 |
| | | | | 706/45 |
| 11,734,493 | B2 | 8/2023 | Kramer | |
| 11,922,328 | B1 | 3/2024 | Gdak et al. | |
| 11,972,254 | B2 * | 4/2024 | Pappu | G06F 9/44526 |
| 2018/0101791 | A1 * | 4/2018 | Viswanathan | G06N 20/20 |
| 2019/0130262 | A1 * | 5/2019 | Teredesai | G06N 20/20 |
| 2020/0387356 | A1 * | 12/2020 | Davis | G06F 8/72 |
| 2024/0020113 | A1 * | 1/2024 | Pappu | G06F 8/38 |
| 2024/0202221 | A1 | 6/2024 | Siebel et al. | |
| 2024/0273282 | A1 | 8/2024 | Muralidharan et al. | |

FOREIGN PATENT DOCUMENTS

WO 2024163759 A1 8/2024

* cited by examiner

*Primary Examiner* — Wei Y Mui
*Assistant Examiner* — Amir Soltanzadeh
(74) *Attorney, Agent, or Firm* — INNOVATION CAPITAL LAW GROUP, LLP; Vic Lin

(57) ABSTRACT

The system and method for automated technology migration is disclosed. The method involves receiving source code associated with a source technology comprising unstructured data and structured data. The unstructured data is transformed by generating a hierarchy comprising source set of nodes. Each node among the source set of nodes is classified, by a first machine learning (ML) model, into a corresponding category from among plurality of predefined categories based on a semantic search. In response to the classification, a plurality of ML models optimizes transformation of the source set of nodes into a target set of nodes associated with a target technology. The structured data is transformed into a self-evolving application model and then to target structure using hierarchical mapping module. The self-evolving application model is trained and updated using the plurality of ML models based on at least one sample per unique variation of the source set of nodes.

14 Claims, 12 Drawing Sheets

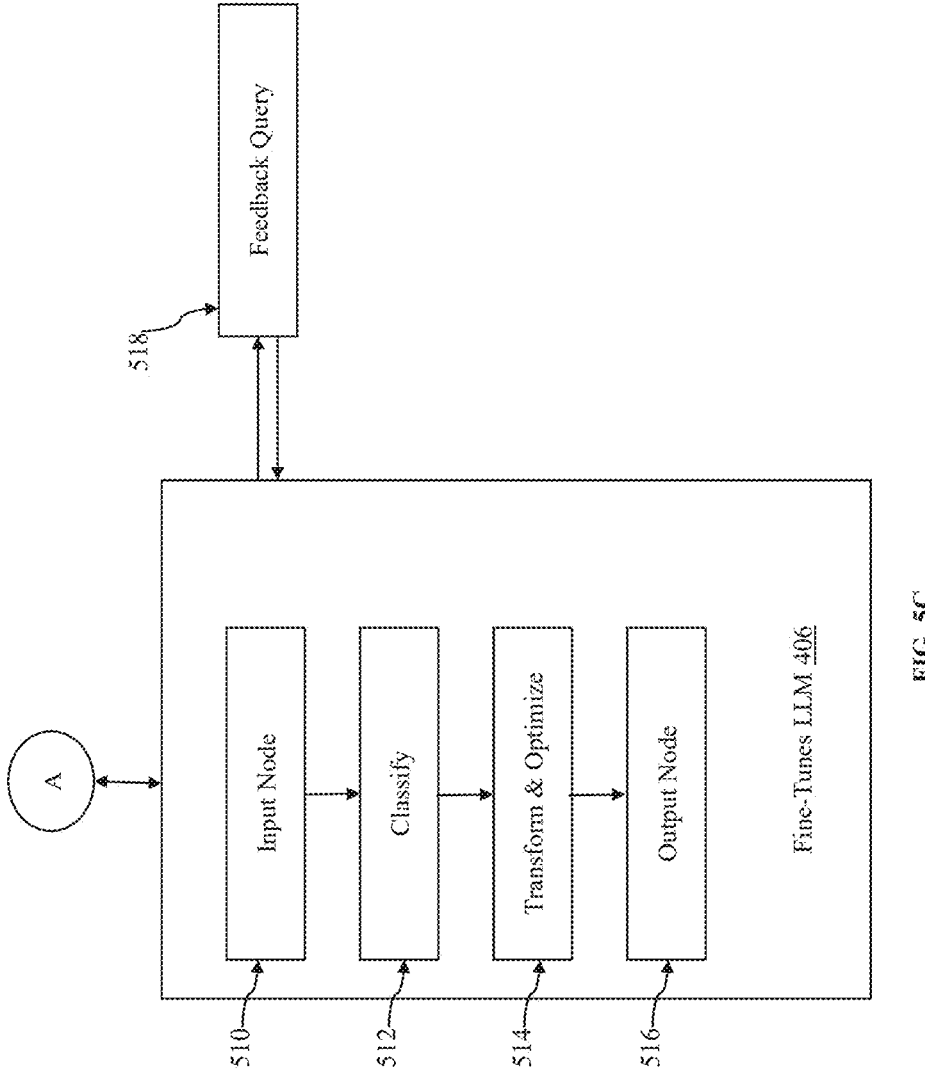

900

902 — Uploading Code Artifacts

904 — aiDAP Code Analysis Component 901

906 — aiDAP Integration Pattern Detector 903

908 — Suggestion applicable pattern for the uploaded code artifacts

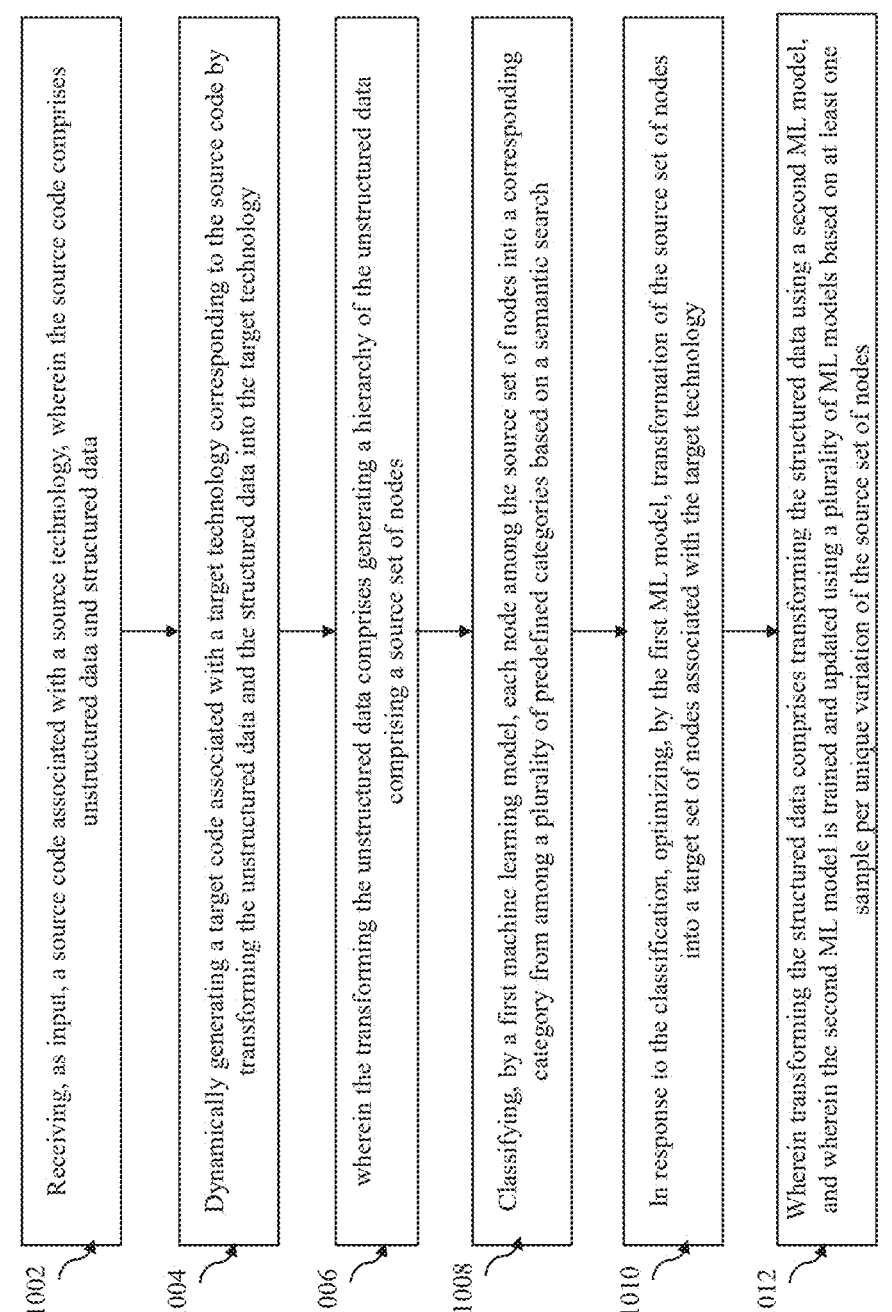

1002   Receiving, as input, a source code associated with a source technology, wherein the source code comprises unstructured data and structured data 1004   Dynamically generating a target code associated with a target technology corresponding to the source code by transforming the unstructured data and the structured data into the target technology 1006   wherein the transforming the unstructured data comprises generating a hierarchy of the unstructured data comprising a source set of nodes 1008   Classifying, by a first machine learning model, each node among the source set of nodes into a corresponding category from among a plurality of predefined categories based on a semantic search 1010   In response to the classification, optimizing, by the first ML model, transformation of the source set of nodes into a target set of nodes associated with the target technology 1012   Wherein transforming the structured data comprises transforming the structured data using a second ML model, and wherein the second ML model is trained and updated using a plurality of ML models based on at least one sample per unique variation of the source set of nodes

SYSTEM AND METHOD FOR AUTOMATED TECHNOLOGY MIGRATION

FIELD OF THE INVENTION

The present disclosure generally relates to technology migration, and more particularly relates to a system and a method for automated technology migration.

BACKGROUND

Generally, technology migration involves transitioning from one technology stack to another, to achieve similar functionality. However, the similar functionality is achieved by using different tools and platforms. In existing methods of the technology migration, there is no exact or direct one-to-one mapping between the code structures. One such example is provided below.

FIG. 1 illustrates an architecture 100 for migrating an integration process implemented in Internation Business Machine IBM Integration Bus (IIB) to its equivalent version in Java, according to the related art.

As illustrated, the architecture 100 includes one or more components sourced from multiple independent projects. The one or more components of the architecture include a policy project 102, a process project 104 at a source side, and a spring boot project 106 at a target side. The said components are configured to contribute partial and overlapping configurations to a final integrated solution.

On the source side, the policy project 102 includes a java database connectivity (JDBC) policy file 102a, such as JDBC Policy 1 102a. The JDBC policy 1 102a defines credentials, connection parameters, and access configurations for backend databases. The JDBC policy 1 102a policy file is referenced by the process project 104, where the actual integration logic resides.

The process project 104 includes a process file 104a. The process file 104a further includes one or more nodes including a web service (WS) input node 104b, a database retriever node 104c, and a WS reply node 104d configured to format and return the response. The WS input node 104b is configured to handle incoming web service requests. The database retriever node 104c is configured to query the database using the reference to the JDBC Policy 1 102a. Connection 104e metadata is defined separately within the process file. This defines the overall process flow and control flow between various nodes within the process.

Further, on the target side, the spring boot project 106 is configured to reconstruct IIB integration using Java-based components. An application.yml 108 file is configured to define a data source, partially replacing the JDBC policy 110. A pom.xml 112 file is configured to declare a required JDBC dependency 114 to replace the remaining information from the JDBC Policy 110. API interfaces are exposed using controller.java 116, which is configured to implement representational state transfer application program interface (REST API) methods 118 equivalent to the IIB web service operations. A process flow 122 logic from the IIB process file is transformed into a route.xml 120 file in the spring boot context, representing an orchestrated service flow using Java and extensible markup language (XML) annotations.

The architecture 100 illustrates that the source side (alternatively referred to as source artifacts) is fragmented and distributed across multiple domains such as policy, orchestration, and runtime logic requiring consolidation and interpretation during migration. Furthermore, the architecture 100 emphasizes the lack of a one-to-one mapping between the source side and the target side, highlighting a complexity inherent in such transformation processes.

For example, the migration often involves text translation and mapping structured data to application models. However, training machine learning (ML) models for text translation requires a large volume of data. While the required data can be acquired for certain technologies when the corresponding code is available and permits its use for ML model training, other technologies offer only a limited amount of usable data. As a result, finetuning or training the ML models in those cases becomes challenging.

Real-world enterprise scenarios involve an even greater number of interconnected elements and mixed-format data, which makes such transformations non-trivial. Traditional approaches using large language models (LLMs) focus primarily on generating single outputs like code snippets or configuration files and are insufficient in addressing the entire end-to-end transformation process.

In recent years, the LLMs have become more efficient and capable of handling larger amounts of data in one go. However, dealing with larger input data, such as a higher number of tokens, requires a larger infrastructure and may incur higher costs, particularly for SaaS-based LLMs. Further, the existing LLMs fail to provide accurate results in cases where data may exist in multiple formats.

However, many packaged applications have structured formats for code and configurations. The existing LLMs do not work properly in such context, where the structured formats for the code and the configurations are required. The problem becomes geometrically complex as the source and target platforms increase.

Further, during technology migration, one of the key challenges is to visualize and get insights pertaining to the existing code at various levels. Therefore creating this as-is visualization with the detailed insights is a time-consuming activity and needs involvement from various stakeholders like external system subject matter experts (SMEs), current platform SME, functional consultants, and business. Further, the creation of such visualization and discovery have various drawbacks such as increased timeline, high cost since the process involves various stakeholders, low-medium accuracy since the visualization and discovery are performed manually.

Therefore, in view of the above-mentioned problems, it is desirable to provide a system and a method that may eliminate the above-mentioned problems of the existing solutions.

SUMMARY

This summary is provided to introduce a selection of concepts, in a simplified format, that are further described in the detailed description of the present disclosure. This summary is neither intended to identify key or essential inventive concepts of the present disclosure nor is it intended for determining the scope of the present disclosure.

The present disclosure discloses a system and a method for automated technology migration. The method includes receiving, as input, a source code associated with a source technology. The source code comprises unstructured data and structured data. The method further includes dynamically generating a target code associated with a target technology corresponding to the source code by transforming the unstructured data and the structured data into the target technology. The transforming the unstructured data comprises generating a hierarchy of the unstructured data comprising a source set of nodes. The method further includes classifying, by a first machine learning (ML) model, each node among the source set of nodes into a corresponding category from among a plurality of predefined categories, based on a semantic search. The method further includes optimizing, by plurality of ML models, transformation of the source set of nodes into a target set of nodes associated with a target technology in response to the classification. The transforming the structured data comprises transforming the structured data into a self-evolving application model using a hierarchical mapping module. The self-evolving application model is trained and updated using a plurality of ML models based on at least one sample per unique variation of the source set of nodes.

The system includes a memory coupled with at least one processor. The at least one processor is configured to receive, as input, a source code associated with a source technology. The source code comprises unstructured data and structured data. The processor is further configured to dynamically generate a target code associated with a target technology corresponding to the source code by transforming the unstructured data and the structured data into the target technology. To transform the unstructured data, the processor is configured to generate a hierarchy of the unstructured data comprising a source set of nodes. The processor is further configured to classify, by a first machine learning (ML) model, each node among the source set of nodes into a corresponding category from among a plurality of predefined categories, based on a semantic search. The processor is further configured to optimize, by the plurality of ML models, transformation of the source set of nodes into a target set of nodes associated with a target technology in response to the classification. To transform the structured data, the processor is configured to transform the structured data into a self-evolving application model using a hierarchical mapping module. The self-evolving application model is trained and updated using a plurality of ML models based on at least one sample per unique variation of the source set of nodes.

To further clarify the advantages and features of the present disclosure, a more particular description of the present disclosure will be rendered by reference to specific embodiments thereof, which are illustrated in the appended drawings. It is appreciated that these drawings depict only typical embodiments of the present disclosure and are therefore not to be considered limiting of its scope. The present disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 5A-5C illustrate flowcharts depicting a process 500 depicting a hierarchical mapping process for the automated technology migration, in accordance with an embodiment of the present disclosure;

FIG. 10 illustrates a flowchart depicting a method for the automated technology migration, according to an embodiment of the present disclosure.

Figure 1:
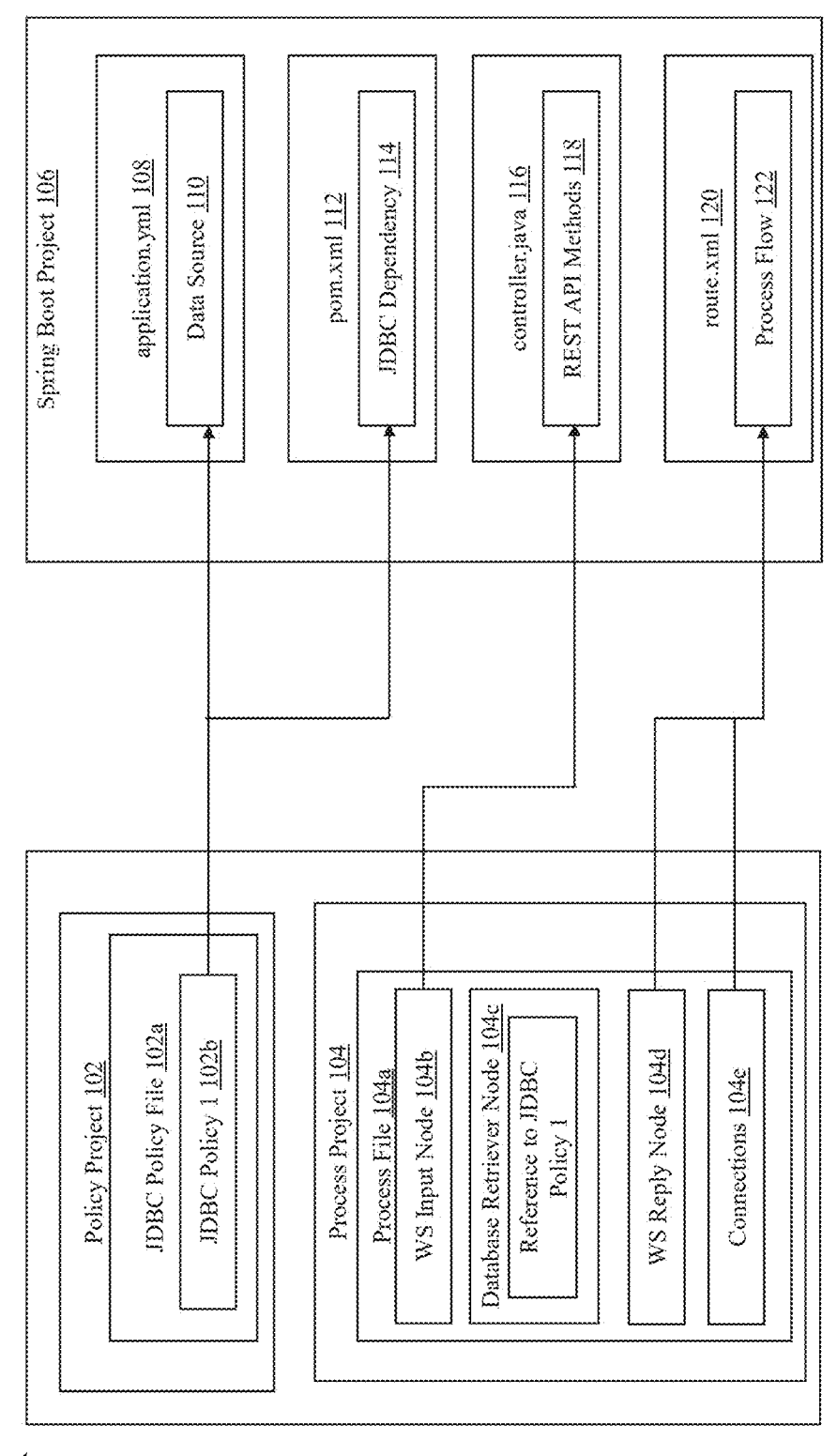
FIG. 1 illustrates an architecture for migrating an integration process implemented in IBM Integration Bus (IIB) to its equivalent version in Java, according to the related art.

Further, skilled artisans will appreciate that elements in the drawings are illustrated for simplicity and may not have necessarily been drawn to scale. For example, the flow charts illustrate the method in terms of the most prominent steps involved to help improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

For the purpose of promoting an understanding of the principles of the present disclosure, reference will now be made to the various embodiments and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more elements is required."

Reference is made herein to some "embodiments." It should be understood that an embodiment is an example of a possible implementation of any features and/or elements of the present disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the present disclosure will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Figure 2:
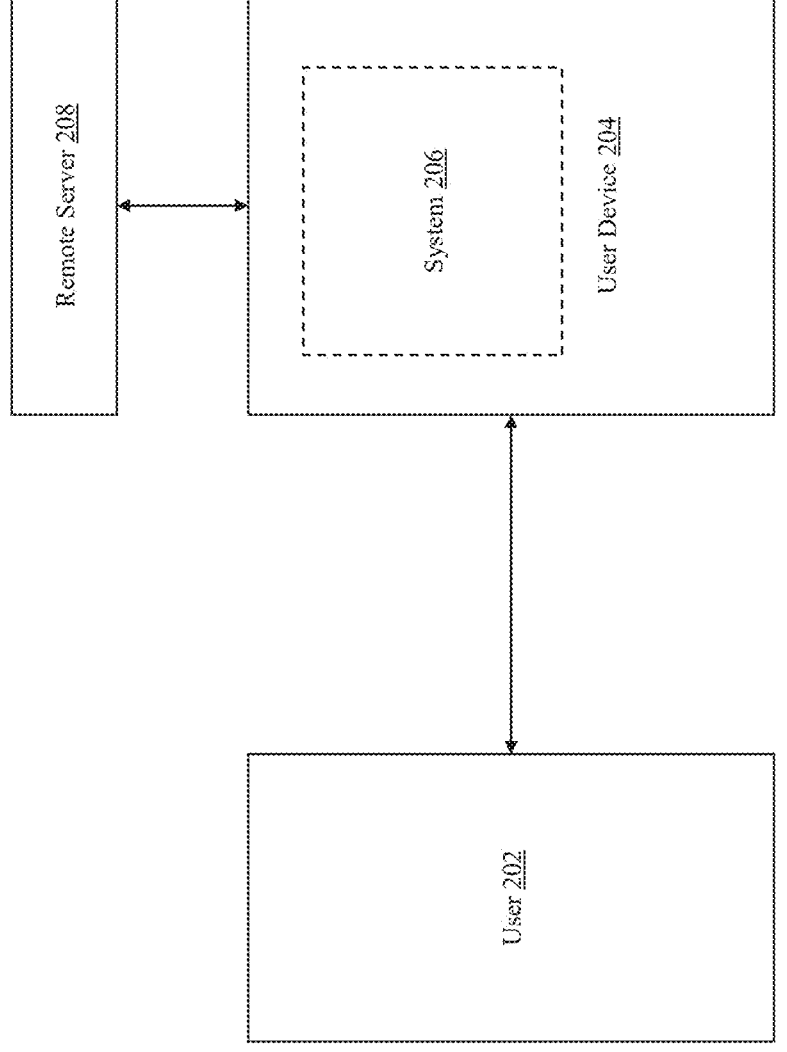
FIG. 2 illustrates an environment for an implementation of a system for automated technology migration, according to an embodiment of the present disclosure.

FIG. 2 illustrates an environment 200 for an implementation of a system 206 for automated technology migration, according to an embodiment of the present disclosure.

The environment 200 may include a user 202, a user device 204 associated with the user, and a remote server 208 in communication with the user device 204. In an embodiment, the user 202 may interact with the user device 204 by providing suitable commands through a user interface (UI) of the user device 204. In one embodiment, the environment 200 may include the system 206 that may be implemented at the user device 204. In another embodiment, the system 206 may be implemented at the remote server 208.

In a non-limiting example, the user device 204 may include a computer, a desktop, a laptop, a tablet, a fablet, or a smartphone. The user device 204 may be configured to communicate with the remote server 208 through a wired or wireless communication channel such as Wireless Fidility (Wi-Fi), Bluetooth, Fourth Generation/Fifth Generation (4G/5G), or radio frequency (RF) communication.

In an exemplary embodiment, the user 202 operating the user device 204 may control the system 206 by providing one or more instructions in the form of code or a command.

In another exemplary embodiment, the user 202 may install a predefined application dedicated to the automated technology migration on the user device 204. The predefined application may provide a UI on the user device 204 for controlling the system 206 for the automated technology migration.

In an embodiment, the system 206 may be configured to receive, as input, a source code associated with a source technology. The source code may include unstructured data and structured data.

Further, the system 206 may be configured to dynamically generate a target code associated with a target technology corresponding to the source code by transforming the unstructured data and the structured data into the target technology. In an embodiment, the system 206 may be configured to generate a hierarchy of the unstructured data to transform the unstructured data. In an embodiment, the hierarchy of the unstructured data may include a source set of nodes.

In an embodiment, the system 206 may be configured to generate the hierarchy by converting the unstructured data of the source code into extensible markup language (XML).

Further, the system 206 may be further configured to classify, by a first machine learning (ML) model 314, each node from amongst the source set of nodes into a corresponding category from among a plurality of predefined categories, based on a semantic search.

In an embodiment, the system 206 may be configured to generate the hierarchy by converting the unstructured data of the source code into XML.

Furthermore, the system 206 may be configured to optimize, by the plurality of ML models 318, transformation of the source set of nodes into a target set of nodes associated with a target technology in response to the classification. The system 206 may be configured to transform the structured data into a self-evolving application model using a hierarchical mapping module 320. The self-evolving application model 316 may be trained and updated using plurality of ML models 318 based on the at least one sample per unique variation of the source set of nodes.

In an embodiment of the present disclosure, the system 206 may be configured to train the self-evolving application model 316. In an embodiment, the system 206 may be configured to obtain the at least one sample to train the self-evolving application model 316 in an intended technology. The system 206 may be configured to identify a format of the at least one sample using a format identifier ML model. The system 206 may be configured to convert the at least one sample from the identified format into the XML format using a conversion ML model. The system 206 may be configured to analyze the XML format of the at least one sample with respect to an existing version of the self-evolving application model 316 to determine, one or more types of files in the at least one sample, one or more nodes associated with the one or more files and one or more relationships among the one or more nodes.

The system 206 may be further configured to determine confidence scores corresponding to each of the one or more nodes associated with each of the one or more files and based on the determined one or more relationships. The system 206 may be configured to obtain user feedback when a consolidated confidence score is below a predefined threshold confidence score. The consolidated confidence score is based on the corresponding scores. The system 206 may be configured to train and update the existing version of the self-evolving application model 316 based on the user feedback using the plurality of ML models 318.

In an embodiment of the present disclosure, the system 206 may be further configured to generate a mapping for the intended technology and a trained and updated version of the self-evolving application model 316.

In an embodiment, the system 206 may be configured to transform the plurality of nodes into the target technology with respect to the parallel classification. The system 206 may be further configured to combine the transformed plurality of nodes to generate the unstructured data transformed into the target technology.

In an embodiment of the present disclosure, prior to generating the target code, the system 206 may be configured to identify using predetermined ML techniques, one or more building blocks of the source code. The system 206 may be further configured to visualize the source code for illustrating a relationship among the one or more building blocks. The system 206 may be further configured to identify one or more integration patterns from a plurality of integration patterns based on the relationship among the one or more building blocks of the source code. The system 206 may be further configured to dynamically generate the target code based on one of the one or more identified integration patterns. In various embodiments, the system 206 for the automated technology migration may be discussed in detail in conjunction with FIG. 3.

Figure 3:
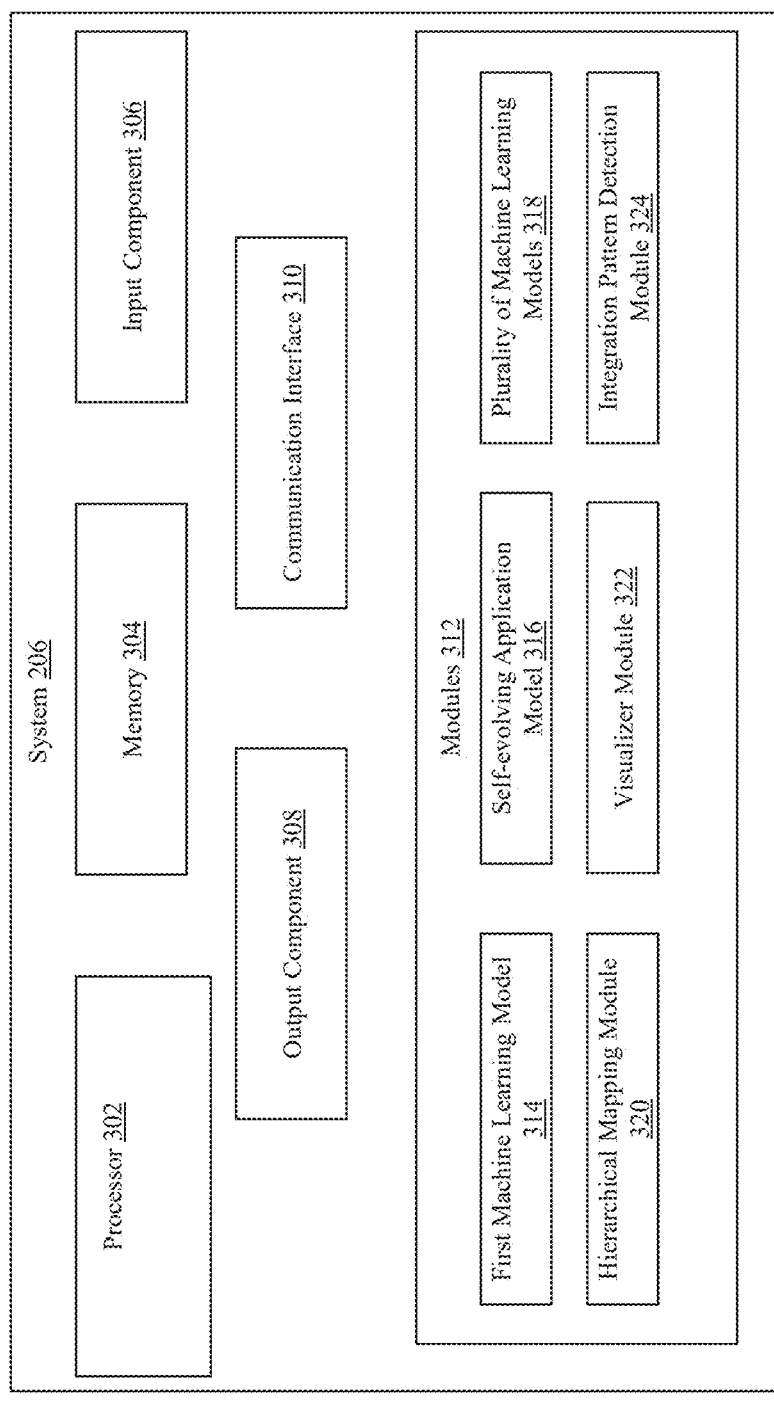
FIG. 3 illustrates a schematic diagram depicting the system for the automated technology migration, according to an embodiment of the present disclosure.

FIG. 3 illustrates a schematic diagram depicting the system 206 for the automated technology migration, according to an embodiment of the present disclosure. In an embodiment of the present disclosure, the system 206 may be deployed at the user device 204.

The system 206 may include but is not limited to, one or more processors 302 (referred to as the "processor 302"), a memory 304, an input component 306, an output component 308, a communication interface 310, and one or more modules 312.

The one or more processors 302 may be a single processing unit or several units, all of which could include multiple computing units. The one or more processors 302 may be implemented as one or more microprocessors, microcomputers, microcontrollers, digital signal processors, central processing units, state machines, logic circuitries, and/or any devices that manipulate signals based on operational instructions. Among other capabilities, the one or more processors 302 are adapted to fetch and execute computer-readable instructions and data stored in the memory 304. In an embodiment of the present disclosure, the processor 302 may further include the hierarchical mapping module 320.

In one embodiment, the memory 304 may include suitable logic, circuitry, and interfaces that may be configured to store a data associated with the technology migration, the machine learning modules, and other data related to the migration of technology. Examples of the memory 304 may include, but are not limited to, a random-access memory (RAM), a read-only memory (ROM), a removable storage drive, a hard disk drive (HDD), a flash memory, a solid-state memory, or the like. It will be apparent to a person skilled in the art that the scope of the disclosure is not limited to realizing the memory 304 in the system 206, as described herein. In other embodiments, the memory 304 may be realized in the form of a database or a cloud storage working in conjunction with the processor 302, without deviating from the scope of the disclosure.

The input component 306 may be configured to receive information, such as user input. For example, the input component 306 may include, but not be limited to, a touchscreen display, a keyboard, a keypad, a mouse, a button, a switch, and/or a microphone associated with the system 206.

The output component 308 may be configured to display information from the system 206 to the user 202 or other systems, utilizing a variety of devices and technologies tailored to specific application needs. The output component 308 may include visual output devices such as display screens, Liquid Crystal Displays, Light Emitting Diode, Organic Light Emitting Diode (LCD, LED, OLED), projectors, and heads-up displays (HUDs) for presenting graphical or textual information. Additionally, auditory output through speakers and headphones provides audio feedback and alerts, while haptic output devices, like vibration motors in smartphones or game controllers, offer tactile feedback. Functionally, the output component 308 serves multiple roles, including displaying graphical user interface (GUI) elements for user interaction, delivering notifications and alerts through sound, visual indicators, or vibrations, and rendering complex data visualizations like charts and graphs for easier comprehension.

In an embodiment, the output component 308 may be configured to receive processed data from the processor 302, which determines the information to be communicated, and the output component 308 may access the memory 304 to retrieve and display stored information such as documents, media files, or application states.

Furthermore, the output component 308 may be configured to meet the specific requirements of different applications, such as high-resolution visual output and immersive audio for gaming systems or clear and precise data visualization and alert mechanisms for industrial control systems. Through these varied output methods, the output component 308 ensures effective communication of information, enhancing both the system 206 functionality and user experience.

The communication interface 310 is a hardware and/or software component that may be configured to enable the system 206 to exchange data with other user devices or systems. The communication interface 310 may be configured to serve as the link for transmitting and receiving information, either within a local environment (e.g., between components of the same system) or across networks.

The one or more modules 312, amongst other things, include routines, programs, objects, components, data structures, etc., which perform particular tasks or implement data types. The module(s) 312 may also be implemented as, signal processor(s), state machine(s), logic circuitries, and/or any other device or component that manipulates signals based on operational instructions.

Further, the one or more modules 312 may be implemented in hardware, instructions executed by a processing unit, or by a combination thereof. The processing unit can comprise a computer, a processor, such as the one or more processors 302, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the one or more modules 312 may be machine-readable instructions (software) which, when executed by the processor/processing unit 302, perform any of the described functionalities.

In an embodiment, the one or more modules 212 may include the first ML model 314, the self-evolving application model 316, the plurality of machine learning models 318, the hierarchical mapping module 320, a visualizer module 322, and an integration pattern detector 324. The first ML model 314, the self-evolving application model 316, the plurality of ML models 318, the hierarchical mapping module 320, the visualizer module 322, and the integration pattern detector 324 may be in communication with each other.

In operation, the processor 302 may be configured to receive, via the input component 306, the source code. The source code may refer to a technology-specific software code associated with the source technology. In an embodiment, the source code may include a combination of the structured data and the unstructured data. In an embodiment, the structured data may include process definition files, connector configuration files, or other formats that conform to a predefined schema. In an embodiment, the unstructured data may include free-form code, comments, and documentation (e.g., business logic embedded in custom scripts).

In an exemplary scenario, the source technology may be a legacy enterprise Java-based application, and the received source code may include XML configurations (structured data) and custom script-based service logic (unstructured data).

In an embodiment, upon receiving the source code, the processor 302 may be configured to dynamically generate the target code. The target code is dynamically generated by transforming the unstructured data and the structured data into the target technology. Further, the target code is associated with the target technology corresponding to the source code. In an embodiment, the target code may refers to the equivalent or optimized version of the source code in the target technology. For example, python, node.js, or serverless configuration formats.

Further, the processor 302 may be configured to generate the hierarchy of the unstructured data that may include the source set of nodes to transform the unstructured data. The hierarchy may refer to a structural representation of logical elements in the unstructured data. In an embodiment, structural representation of logical elements may include the source set of nodes. Each node in the source set of nodes may correspond to a logical or functional construct identified within the unstructured data. For example, a decision block, a loop construct, or a data transformation step.

For example, consider a segment of source code written in a scripting language that implements a simple validation followed by a transformation operation. The original code may be written as:

```
if order.amount>1000:
    order.flag="High Value"
log (order)
```

The processor 302 may convert the above unstructured source code into an XML-based hierarchical representation. The resulting hierarchy may include a root-level <if> node representing the decision block, a nested <assignment> node representing the transformation logic, and a sibling <log> node representing the logging step. An example of the generated hierarchy is illustrated below:

```
<if condition="order.amount>1000">
    <assignment target="order.flag" value="High Value"/>
</if>
<log value="order"/>
```

In an embodiment, the processor 302 may be configured to generate the hierarchy by converting the unstructured data of the source code into the XML. The XML representation may provide a machine-readable and standardized structure that may be suitable for downstream processing and classification.

Following the generation of the hierarchy, the processor 302 may be configured to classify each node among the source set of nodes into the corresponding category from among the plurality of predefined categories, based on the semantic search using the first machine learning (ML) model 314. The semantic search refers to a process that evaluates the contextual meaning and intent of the content in each node rather than relying solely on keyword matching.

The processor 302 may be further configured to parallelly classify the plurality of nodes in the source set of nodes. The parallel classification may refer to the concurrent execution of multiple classification operations across distinct nodes of the hierarchy to improve computational efficiency and processing speed.

For example, the unstructured data includes logic spanning 50 decision points. In this case, the processor 302 simultaneously assigns categories to all 50 corresponding nodes using vectorized evaluation in the first ML model 314.

Upon classifying each node among the source set of nodes, the processor 302 may be further configured to optimize the transformation of the source set of nodes into the target set of nodes associated with the target technology in response to the classification by using the first ML model 314. The optimization refers to refining or enhancing the transformation outcome by selecting transformation strategies based on the category assigned to each node, thereby improving the alignment of transformed nodes with the expected constructs in the target technology.

The processor 302 may be configured to transform the structured data into the self-evolving application model 316 using the hierarchical mapping module 320. The self-evolving application model 316 may be trained and updated using the plurality of ML models 318 based on the at least one sample per unique variation of the source set of nodes.

In an exemplary scenario, if a sequential query language SQL query in the source technology involves joining multiple tables with nested subqueries, the self-evolving application model 316 may transform it into an equivalent python script using an object-relational mapping (ORM) ( ) in the target technology.

In an embodiment, to optimize the transformation, the processor 302 may be configured to transform the plurality of nodes into the target technology with respect to the parallel classification. The parallel classification may refer to concurrently classifying and transforming multiple nodes from the source set of nodes based on their respective categories. In an advantageous effect, the transformation of the plurality of nodes into the target technology may enhance efficiency and scalability during the migration process.

The processor 302 may be further configured to combine the transformed plurality of nodes to generate the unstructured data transformed into the target technology. The combination process may involve reconstructing the logical flow, execution dependencies, and operational hierarchy among the transformed nodes to produce a unified and executable representation in the target codebase. This ensures that the transformation not only maps individual elements accurately but also preserves the original business logic and processing sequence as expressed in the unstructured data of the source code.

In an embodiment of the present disclosure, the processor 302 may be configured to train the self-evolving application model 316. The processor 302 may be configured to obtain the at least one sample to train the self-evolving application model 316 in the intended technology.

In an example, the at least one sample may include a fully developed Node.js microservice that handles customer order processing, defined using RESTful API patterns, a NoSQL database schema (e.g., MongoDB), and supporting business logic in JavaScript.

The processor 302 may be configured to identify the format of the at least one sample using the format identifier ML model. The processor 302 may be further configured to convert the at least one sample from the identified format into the XML format using the conversion ML model. The format refers to the encoding structure and file type of a given sample component, such as .js, .json, .yaml, or .ts (TypeScript), each of which may follow different syntactic and semantic conventions.

Upon converting the at least one sample from the identified format into XML format, the processor 302 may be configured to analyze the XML format of the at least one sample with respect to the existing version of the self-evolving application model 316 to determine, the one or more type of files in the at least one sample, the one or more nodes associated with the one or more files, and the one or more relationships among the one or more nodes. The one or more relationships refers to logical, sequential, or dependency-based associations among nodes, such as conditional branches within functions, data flows between API endpoints, or hierarchical ownership in data schema.

In one example, the processor 302 may be configured to analyze and identify three files from the sample, such as orderController.js identified as JavaScript with Express.js route definitions, orderSchema.js identified as JSON-based NoSQL schema, and api-config.yaml identified as a YAML file defining API Gateway routing.

After identifying the format, the processor 302 may be configured to invoke a conversion ML model (also within the Plurality of Machine Learning Models 318) to convert the at least one sample from the identified format into the XML format. The XML format refers to a hierarchically structured representation that facilitates model interpretation and downstream processing. For instance, a file originally authored in JavaScript containing a function processOrder ( ) may be converted into the XML format containing nodes such as <function>, <parameters>, and <body>, preserving semantic meaning while enabling structured parsing.

In an example, a sample project may include a customerController.js file defining API endpoints, an orderSchema.json file for product ordering validation, and an api-config.yaml file for defining API Gateway paths. The processor 302 may identify the three files respectively as JavaScript, JSON, and YAML formats. The conversion ML model may then transform the three files into a standardized XML structure, with the JavaScript logic converted into <route>, <method>, and <handler> nodes, the JSON schema into <entity>, <field>, and <validation> nodes, and the YAML configuration into <api>, <path>, and <target> elements.

The processor 302 may be further configured to determine the confidence scores corresponding to each of the one or more nodes associated with each of the one or more files and based on the determined one or more relationships. The processor 302 may be configured to obtain the user feedback when the consolidated confidence score is below the predefined threshold confidence score. The consolidated confidence score is based on the corresponding scores. In one embodiment, the processor 302 may be configured to train and update the existing version of the self-evolving application model 316 based on the user feedback.

For example, the processor 302 may assign a high confidence score (e.g., 92%) to a JavaScript GET/customer route handler when its transformation into a serverless function closely matches a known, well-trained example. Conversely, a more complex logic block that includes custom caching or retry logic may receive a lower score (e.g., 63%) due to variability in structure and lack of clear historical precedents.

Once individual confidence scores corresponding to each of the one or more nodes have been computed, the processor 302 may be configured to determine the consolidated confidence score for the entire sample or transformation batch. The consolidated score is derived by aggregating the individual node-level scores, using a weighted or normalized method that reflects the overall certainty in the transformation process. In this scenario, if the consolidated confidence score is below a predefined threshold, for example 75%, the system may consider the transformation output as requiring external validation.

In such cases, the processor 302 may be configured to obtain the user feedback. The user feedback may be acquired via a user interface exposed through the output component 308, where a developer or migration analyst reviews the transformed target code and provides suggestions or corrections.

For example, the reviewer may modify the structure of a transformed database interaction, clarify an ambiguous data validation rule, or adjust a misaligned sequence of operations.

Upon receiving the user feedback, the processor 302 may be further configured to train and update the existing version of the self-evolving application model 316. The training process involves incorporating the corrected transformations and related patterns as newly labeled data, thereby improving the self-evolving model's ability to handle similar variations in future transformations. Over time, this continuous learning loop allows the processor 302 to adapt to diverse enterprise code styles and domain-specific practices, enhancing transformation accuracy and reducing reliance on manual intervention.

In an embodiment of the present disclosure, the processor 302 may be further configured to generate the mapping for the intended technology and the trained and updated version of the self-evolving model 316 using the hierarchical mapping model 320. The mapping refers to a structured, reusable association between a source construct in the source technology and its corresponding transformed construct in the target technology, derived from training data, transformation outcomes, and user-validated corrections.

In the continuation of the retail microservices transformation scenario, assume that the updated self-evolving model 316 has successfully learned to transform GridView data-bound controls in ASP.NET into equivalent React-based components with asynchronous API calls and paginated responses. The processor 302 may be configured to analyze such verified transformation patterns and encode them into a formal mapping schema. The formal mapping schema may include matched entities such as source identifiers, transformation rules, logical equivalence metrics, and confidence scores, stored in a structured form such as the XML, JSON, or within a transformation database.

For example, the processor 302 may be configured to generate a mapping rule stating that an ASP.NET SqlData- Source object with inline SQL queries should be mapped to a Node.js model.find( ) method using Mongoose, with pagination logic implemented via skip/limit parameters. Similarly, form validation is handled via server-side Page.IsValid checks in the source may be mapped to client-side form.validate( ) functions in the target React application, with fallback server-side validation logic represented through Express middleware.

In an embodiment of the present disclosure, prior to generating the target code, the processor 302 may be configured to identify using the predetermined ML techniques, the one or more building blocks of the source code. The building blocks refer to logical or functional components of the source code such as user authentication modules, payment gateways, logging services, workflow handlers, or external service connectors that together represent the application's modular architecture.

For example, in a monolithic source code developed for a logistics management system, the processor 302 may be configured to identify the one or more building blocks such as order processing, inventory sync, invoice generation, and notification dispatcher. Further, the one or more building blocks may be embedded as class files, services, or utility functions across the source code. The predetermined ML techniques may analyze naming patterns, invocation paths, API endpoints, and module interdependencies to extract them.

Upon identifying the one or more building blocks, the processor 302 may be further configured to visualize the source code to illustrate the relationship among the one or more building blocks. The relationship among the one or more building blocks may refer to call hierarchies, data flow interactions, execution sequences, or dependency mappings among the building blocks. The visualization may be in the form of a directed graph, layered component diagram, or sequence flowchart, enabling the system or the user to understand modular interactions and orchestration logic within the source application.

The processor 302 may be further configured to identify the one or more integration patterns from the plurality of integration patterns based on the relationship among the one or more building blocks of the source code. The one or more integration patterns refer to a structural model that defines how multiple functional components interoperate within an application. The one or more integration patterns may include, for example, orchestration, chained execution, aggregator, request-reply, publish-subscribe, and the like.

For example, in the context of a legacy insurance claim processing system written in the source technology, the processor 302 may identify building blocks such as Document Upload, Claim Validation, Fraud Check, and Approval Engine. Through structural analysis using predefined relationship inference logic, the processor 302 may determine that these components follow a sequential and conditional invocation pattern, where each stage depends on the outcome of the previous one.

Once the one or more integration patterns are identified, the processor 302 may be further configured to dynamically generate the target code based on one of the one or more identified integration patterns.

For example, the processor 302 may generate the target code in a microservice-based target technology, where each building block is implemented as an isolated service (e.g., RESTful endpoint, Lambda function, or containerized task), and the services are connected using an orchestrator such as amazon web services (AWS) Step Functions or Apache Camel to reflect the sequential and conditional logic of the source code. In various embodiments, the system 206 for the automated technology migration may be discussed in detail in conjunction with FIG. 4.

Figure 4:
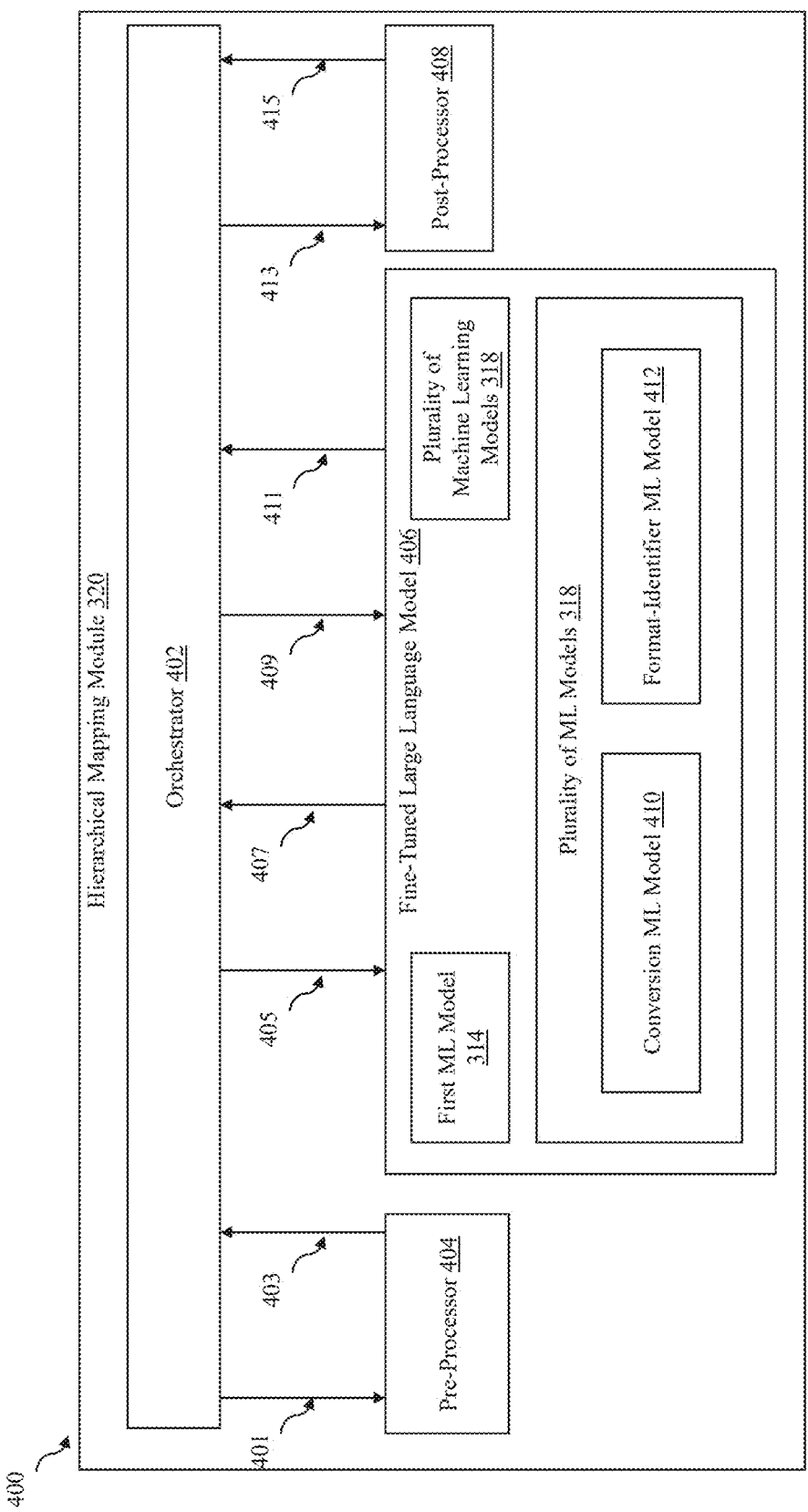
FIG. 4 illustrates a schematic block diagram of a hierarchical mapping module of the system depicting workflow for the automated technology migration, according to an embodiment of the present disclosure.

FIG. 4 illustrates a schematic block diagram 400 of a hierarchical mapping module of the system 206 depicting workflow for the automated technology migration, according to an embodiment of the present disclosure.

In an embodiment, the system 206 may include an orchestrator 402, a pre-processor 404, a fine-tune large language model (LLM) 406, and a post-processor 408. The fine-tuned LLM 406 may further include the first ML model 314, the self-evolving application model 316, and the plurality of ML models 318. The plurality of ML models 318 may further include a conversion ML model 410 and a format-identifier ML model 412.

In an embodiment, the orchestrator 402 may be configured to receive the source code associated with the source technology. The source code comprises unstructured data and structured data.

At step 401, the orchestrator 402 may be configured to transform the source code to the pre-processor 404 in response to receiving the source code.

At step 403, the pre-processor 404 may be configured to generate the hierarchy of the unstructured data comprising the source set of nodes and transform the generated hierarchy of the unstructured data to the fine-tuned LLM 406. The hierarchy refers to a structural representation of logical elements in the unstructured data, where the representation comprises the source set of nodes. Each node in the source set of nodes corresponds to a logical or functional construct identified within the unstructured data. For example, a decision block, a loop construct, or a data transformation step.

At step 405, the fine-tuned LLM 406 may be configured to process the source set of nodes to generate the target code associated with the target technology. The fine-tuned LLM 406 may be configured to use at least one of the first ML model 314, the self-evolving application model 316, and the plurality of ML models 318 to generate the target code.

At step 407, the fine-tuned LLM 406 may be configured to query additional information to the orchestrator 402. In one embodiment, the fine-tuned LLM 406, after analyzing a current file and associated nodes, may be configured to determine that the additional information necessary for generating a complete target node is missing or externally referenced. In such cases, the orchestrator 402 may be configured to identify and retrieve the dependent nodes or associated files from the source code that contain the missing information.

For example, in a source system, a first file may include a connector node defining a high-level abstraction, while a second file may include the actual connection details such as endpoint uniform resource locator (URLs), credentials, or authentication protocols. In this scenario, the orchestrator 402 may be further configured to dynamically fetch and merge the dependent information from the second file to complete the transformation of the original connector node into the target node.

At step 409, the orchestrator 402 may be configured to provide the queried additional information to the fine-tuned LLM 406.

At step 411, the fine-tuned LLM 406 may be configured to generate the target code associated with the target technology based on the source set of nodes and the additional information, and transform the target code to the orchestrator 402.

At step 413, the orchestrator 402 may be configured to transmit the target code (alternatively referred to as the transformed code) along with a metadata to the post-processor 408. In one embodiment, the metadata may include details associated with the hierarchical structure of the original source node, including the node's hierarchical level, an indication of whether the node is a leaf node or a top-level node, and the parent node identifier within the overall hierarchy. The metadata enables the post-processor 408 to accurately reassemble the transformed nodes into a logically coherent structure on the target side, ensuring that parent-child relationships, execution order, and modular boundaries are preserved in the generated target code. At step 415, the post-processor 408 may be configured to generate the target code and transmit the target code to the orchestrator 402. In one embodiment, the orchestrator 402 may create the target code with preliminary information based on the available node data. However, as subsequent nodes are processed or additional source files are analyzed, it may be determined that certain information affects the initially generated target node. The post-processor 408 may be configured to update or modify the initially generated node based on these subsequent discoveries, thereby ensuring that the target code incorporates all hierarchical dependencies, updated references, and cross-node relationships before completion.

Figure 5A:
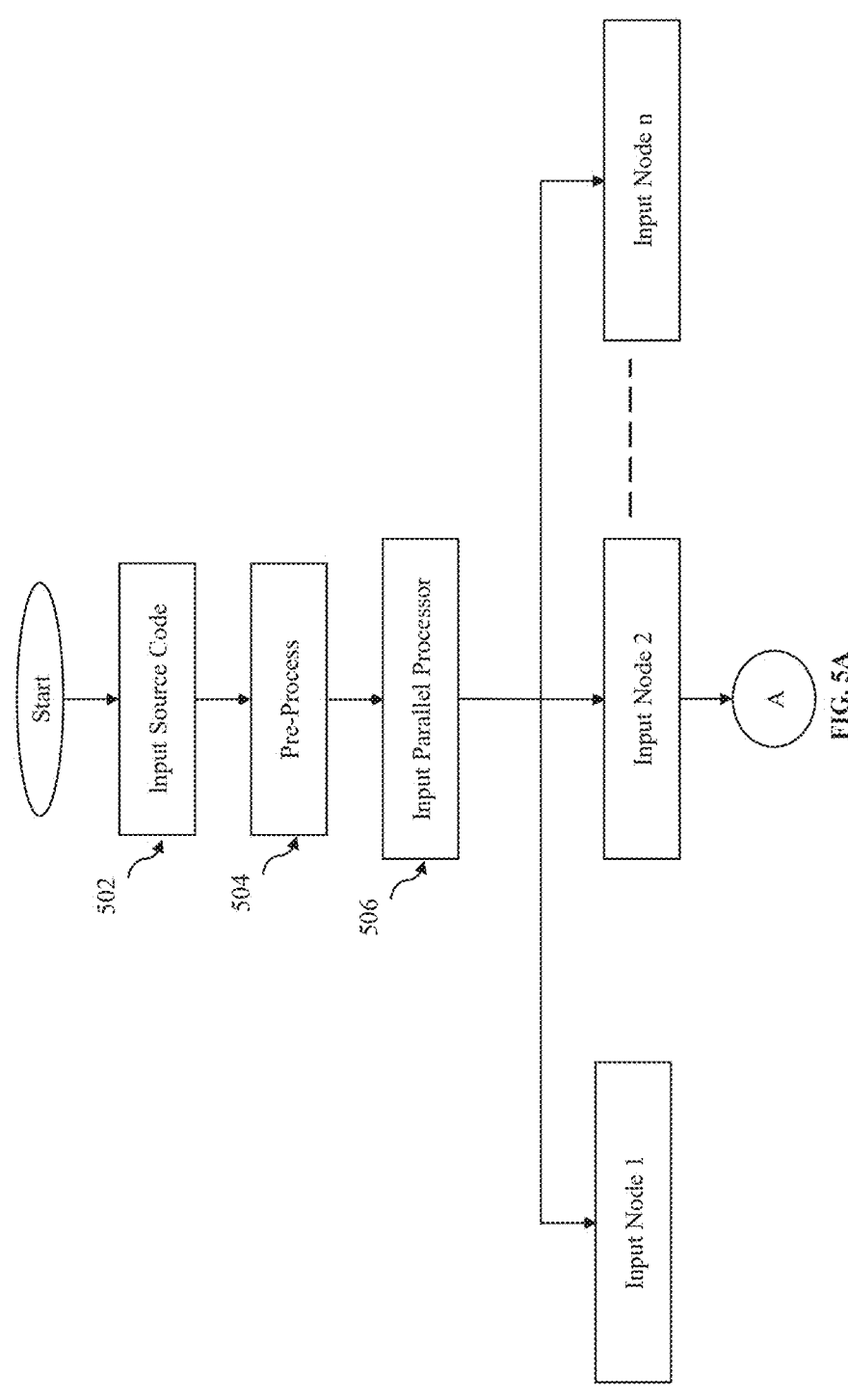
Figure 5B:

FIGS. 5A-5C illustrates a flowchart depicting a hierarchical mapping process 500 for automated technology migration, in accordance with an embodiment of the present disclosure. In an embodiment, the hierarchical mapping process 500 may alternatively refer to process 500 within the scope of the present disclosure.

At step 502, the process 500 may include receiving the input source code associated with the source technology. In an embodiment, the source code may include a combination of unstructured data and structured data, typically encompassing code logic, blocks, and integration constructs.

At step 504, the process 500 may include transforming by generating the hierarchy from the unstructured data. In one embodiment, the step 504 involves converting the unstructured data into XML format. Such a conversion ensures the preservation of logical relationships and structures among code elements such as blocks and statements.

At step 506, the process 500 may include parallelly classifying the plurality of nodes from the source set of nodes. Each node represents a individual block, instruction, or functional unit within the source code. The plurality of nodes from the source set of nodes may include input node 1, input node 2, and so on up to input node n.

At step 508, the process 500 may further include receiving the one or more plurality of input nodes by an LLM wrapper configured to transform the plurality of input nodes to the fine-tuned LLM 406.

At step 510, the process 500 may include providing input node to the classifier. At step 512, the process 500 may further include classifying each node into one of a plurality of predefined categories using semantic search.

At steps 514 and 516, the process 500 may further include transforming the source set of nodes into the corresponding target set of nodes associated with the target technology. At step 518, the process 500 may include accepting feedback queries to refine classification or transformation, increasing accuracy dynamically.

At step 520, the process 500 may include combining the transformed plurality of nodes using an output parallel processor to generate an updated hierarchy. The updated hierarchy represents the unstructured data converted into corresponding elements of the target technology while maintaining the original logic and structure.

At step 520, the process 500 may further include transforming the structured data into the self-evolving application model 316 using the hierarchical mapping module 320. The self-evolving application model 316 may be trained and updated using the plurality of ML models 318, each associated with a unique variation of the source nodes.

At step 520, the process 500 may further include training and updating the self-evolving application model 316. The step includes identifying the format of training samples using the format identifier ML model 412, converting samples into the XML using the conversion ML model 410, and extracting node relationships and file structures.

At step 522, the process 500 may include dynamically generating the final output code based on the identified integration patterns from the relationships among building blocks. The target code generated conforms to the patterns of the target technology and is structured for compilation and execution.

Figure 6:
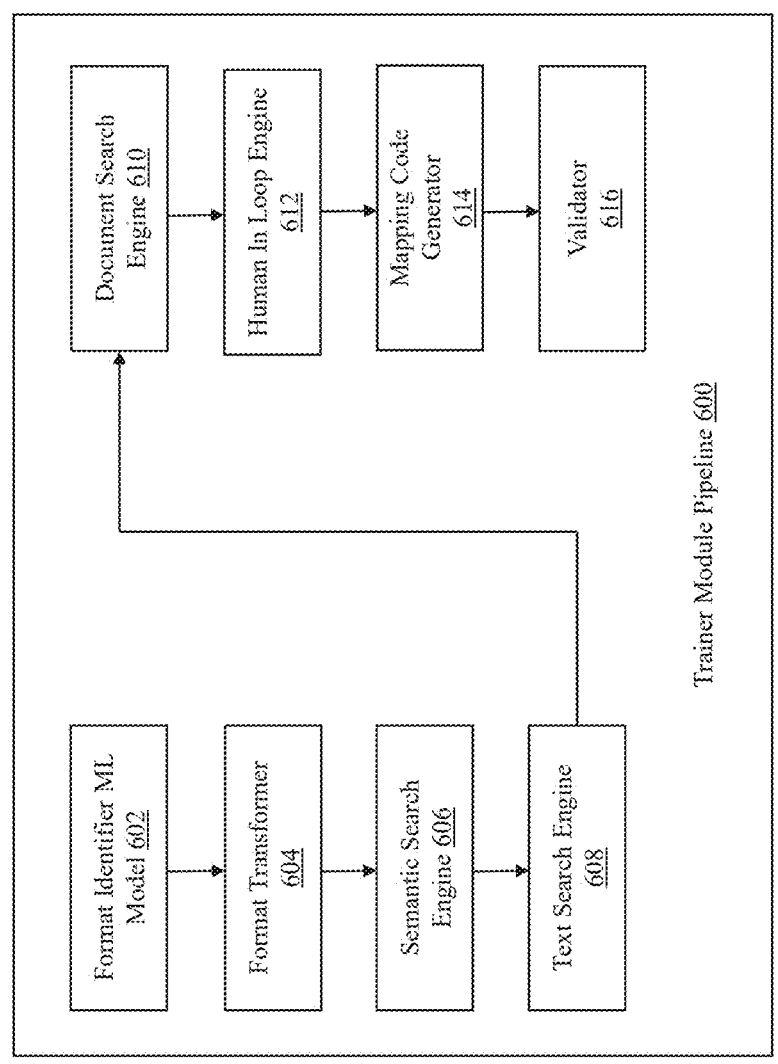
FIG. 6 illustrates a schematic flow diagram depicting a trainer module pipeline for hierarchical mapping and application model update, in accordance with an embodiment of the present disclosure.

FIG. 6 illustrates a schematic flow diagram depicting a trainer module pipeline 600 for hierarchical mapping and self-evolving application model update, in accordance with an embodiment of the present disclosure.

At block 602, the format identifier ML model 412 may be configured to identify the format of the incoming data samples. The incoming data samples may include code, configuration files, or documentation associated with a particular technology. The format identifier ML model 412 is responsible for discerning whether the input is structured or unstructured and tagging the format accordingly.

At block 604, a format transformer may be configured to transform the identified content into a uniform format. In one embodiment, the format transformation includes converting the content into the XML format. The format transformation normalizes varied formats into a structure suitable for hierarchical processing and preserves parent-child relationships among nodes.

At block 606, a semantic search engine may be configured to perform a semantic search to map elements from source data to self-evolving application model. The semantic search engine uses pretrained or fine-tuned models to find meaning-based similarities.

At block 608, a text search engine may be configured to execute a text search to reinforce the semantic findings by checking for direct keyword or phrase-level matches within the self-evolving application model repository.

At block 610, a document search engine may be configured to conduct a document search that uses additional artifacts such as manuals, vendor documentation, or internal technical references to further enrich the understanding of the incoming code samples and resolve ambiguities.

At block 612, human in loop engine may be configured to involve a human in the loop (HITL) to validate or fine-tune the mapping results. Subject Matter Experts (SMEs) may be prompted to confirm the automated suggestions especially for ambiguous or low-confidence mappings.

At block 614, a mapping code generator may be configured to generate mapping code. The mapping code generator may be configured to produce transformation logic that aligns the source technology elements with the self-evolving application model constructs. The generation is recursive and hierarchical in nature i.e., once a parent node is mapped, all child nodes are explored and mapped accordingly.

At block 616, a validator may be configured to validate the generated mapping. The validation ensures the consistency, completeness, and syntactical correctness of the transformation. The output of the validation step can also be presented to SMEs for review before final integration into the self-evolving application model.

Figure 7:
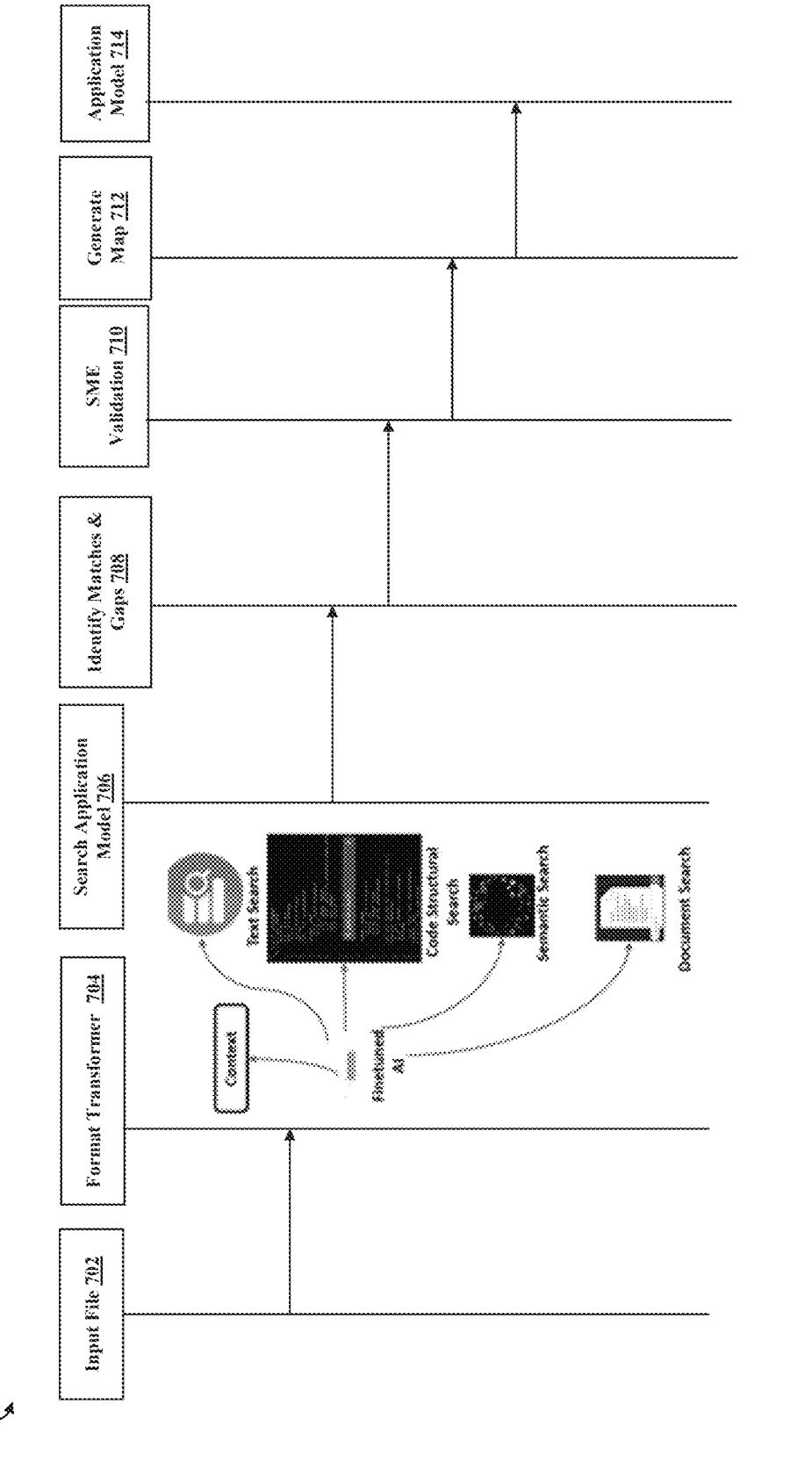
FIG. 7 illustrates a process depicting an exemplary embodiment of the Trainer Module Pipeline for hierarchical mapping and application model update, in accordance with an embodiment of the present disclosure.

FIG. 7 illustrates a process 700 depicting an exemplary embodiment of the Trainer Module Pipeline 600 for hierarchical mapping and the self-evolving application model update, in accordance with an embodiment of the present disclosure.

At step 702, the process 700 may include identifying the format of the input files using a Format Identifier. The input files may originate from various source technologies including but not limited to The Information Bus Company (TIBCO), Internation Business Machine IBM Integration Bus (IIB), Java, Common Business-Oriented Language (COBOL), or unstructured formats such as design documents and diagrams. The Format Identifier may be configured to analyze each file and utilizes a fine-tuned machine learning model 406 to classify the originating technology, even for non-standard or proprietary file formats.

At step 704, the process 700 may include converting or retaining the content in the XML representation using an XML Formatter. Files already in the XML format (e.g., extensible Stylesheet Language Transformations (XSLT), XML Schema Definition (XSD)) are retained as-is, while non-XML content is parsed and converted into the XML format using specialized ML models trained on proprietary datasets. The transformation preserves structural relationships such as parent-child hierarchies and sibling connections to enable accurate semantic interpretation downstream.

At step 706, the process 700 may include performing a multi-level semantic and structural search on the XML-transformed input using a series of machine learning-driven searches. The machine learning-driven searches include:

a. File-level Analysis to classify the file as a process file, mapping file, schema, connector, or other types.

b. Component Analysis to identify the function of each node (e.g., connector nodes, transformation nodes, loop conditions).

c. Relationship Analysis to contextualize the parent-child and sibling relationships across nodes for maintaining the hierarchical structure.

At step 708, the process 700 may include identifying Matches and Gaps between the input file's XML representation and the self-evolving application model. Matching is executed in a hierarchical manner. The parent nodes are first analyzed for matches based on their attributes. If matches are uncertain or scores are low, child nodes are recursively loaded and searched to build additional context and improve confidence scores. All nodes and attributes are evaluated, and confidence scores are generated for each potential match.

At step 710, the process 700 may include SME (Subject Matter Expert) Validation. The SMEs intervene only when necessary, as determined by confidence thresholds. The consolidated confidence scores for matched and unmatched nodes are presented to the SME, who then validates or corrects the mapping. In cases of low-confidence or no-match, the SMEs provide explicit inputs, which are recorded as feedback for retraining and refinement of the model. Such a feedback loop ensures the model becomes more accurate over time with minimal human intervention.

At step 712, the process 700 may further include generating a Mapping using a fine-tuned ML-based mapping engine such as the fine-tuned LLM 406. The confirmed matches are compiled into transformation rules that link source technology elements to the entities in the self-evolving application model. Such mappings are stored and later used to drive the automated migration processes to target platforms.

At step 714, the process 700 may further include the self-evolving application model based on the validated mappings and the SME feedback. New entities or relationships confirmed during this process are appended to the existing self-evolving application model. This enables the system to handle new or previously unknown input types in future iterations with increased accuracy and reduced reliance on SME validation.

Figure 8:
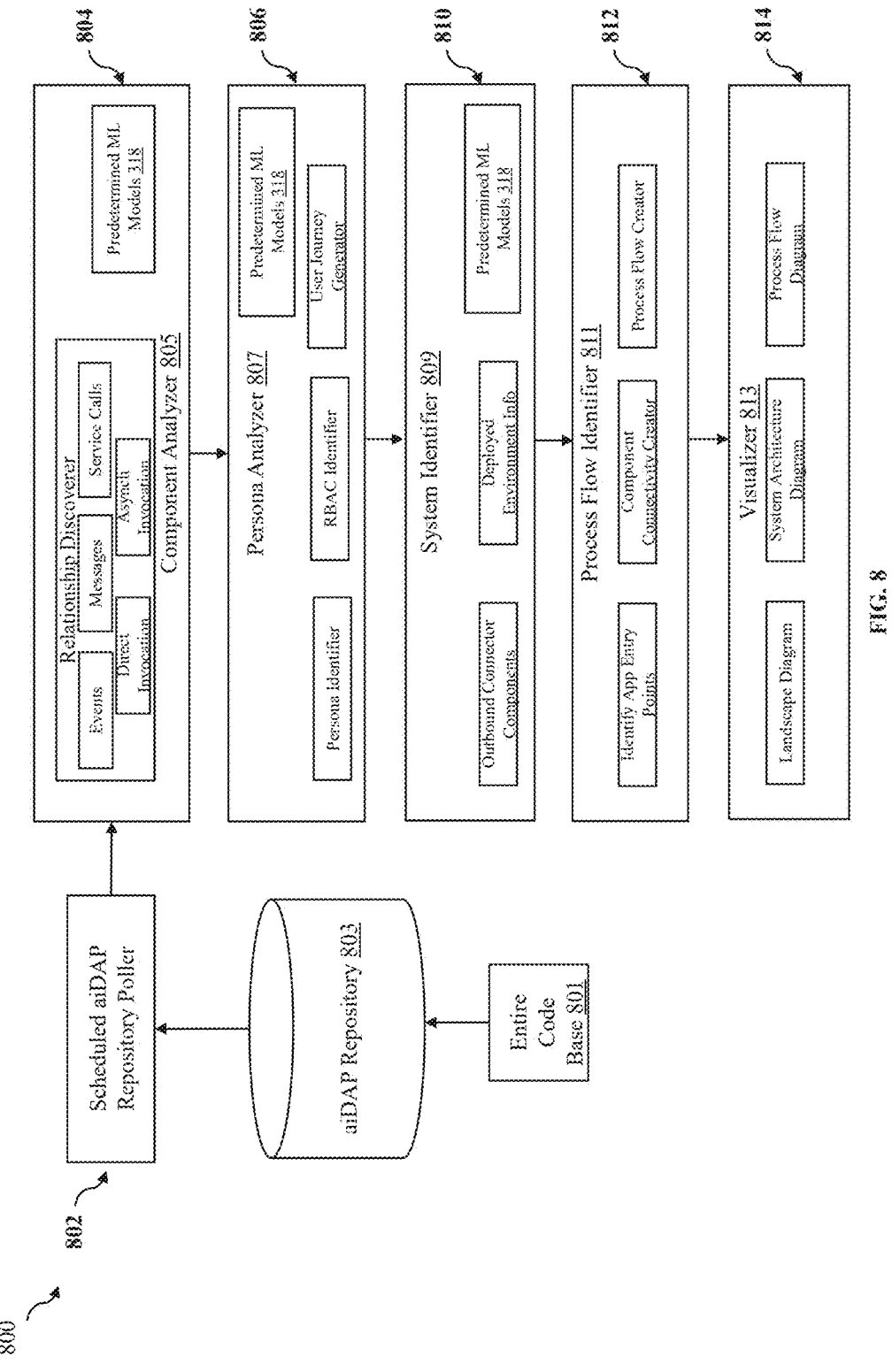
FIG. 8 illustrates a process depicting the visualizer module, in accordance with an embodiment of the present disclosure.

FIG. 8 illustrates a process 800 depicting the visualizer module 322, in accordance with an embodiment of the present disclosure.

At step 802, the process 800 may include polling the aiDAP Repository 803 using a Scheduled aiDAP Repository Poller. The poller identifies updates or delta changes from the entire code base 801 (alternatively referred to as the source code). The source code may further include the application metadata generated and stored from various technology artifacts. The polled data is then passed downstream for automated analysis.

At step 804, the process 800 may include performing component analysis using a component analyzer 805. The component analyzer 805 may be configured to evaluate individual application components against the entire code base 801. The component analyzer 805 is further configured to identify, using the predetermined ML models, one or more building blocks of the source code. These building blocks may include constructs such as services, message flows, transformation rules, event handlers, and other logical components relevant to the source application.

At step 806, the process 800 may include analyzing user roles and access using a persona analyzer 807. The persona analyzer 807 may be configured to use the predetermined ML Models to identify application users, and their associated roles (RBAC), and determine access patterns to the analyzed components. Furthermore, the persona analyzer 807 may be further configured to generate user journeys by mapping persona interactions across the application landscape based on established component relationships.

At step 808, the process 800 may include evaluating outbound connector components and extracting deployed environment configuration information with the help of ML Models using a system identifier 809. The system identifier 809 may be configured to synthesize integration information for both inbound and outbound flows across external systems.

At step 810, the process 800 may include detecting and structuring process flows using a process flow identifier 811. The process flow identifier 811 may be configured to identify application entry points and use the previously discovered component relationships to generate structured process flows.

At step 812, the process 800 may include generating visual insights using a visualizer 813. The visualizer 812 may be configured to illustrate the relationships among the identified building blocks. The visualizer 813 may be configured to convert the analyzed data and relationships into graphical representations including a Landscape Diagram, System Architecture Diagram, and Process Flow Diagram. Such visual outputs help SMEs and system owners to interpret static and dynamic behavior across the application. Additionally, the visualizer 813 may integrate with runtime data to augment diagrams with real-time transactional insights.

Figure 9:
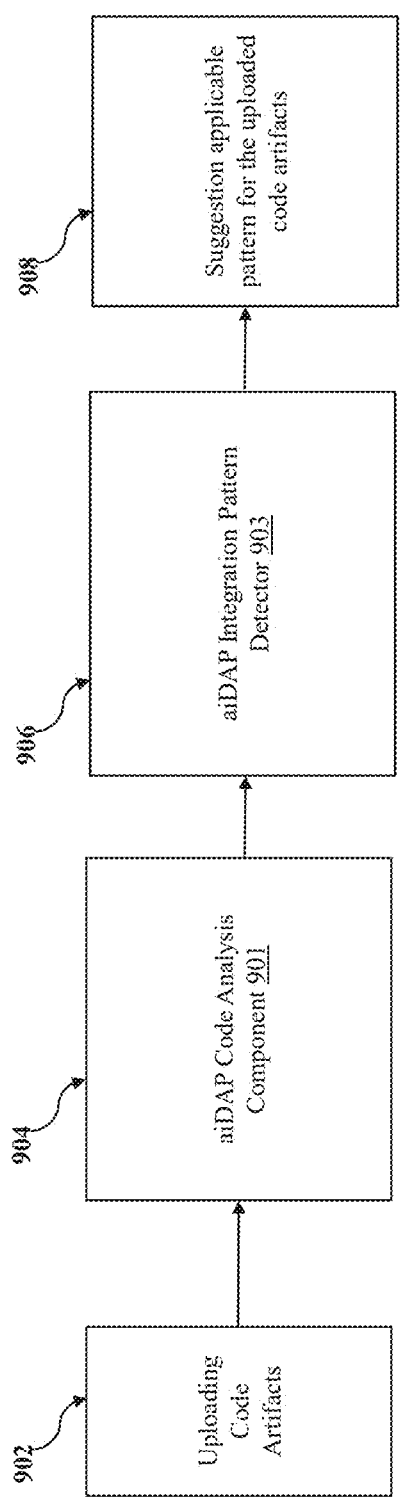
FIG. 9 illustrates a process depicting the integration pattern detection module, in accordance with an embodiment of the present disclosure.

FIG. 9 illustrates illustrates a flow diagram depicting a process 900 performed by the integration pattern detection module 324, in accordance with an embodiment of the present disclosure.

At step 902, the process 900 may include uploading code artifacts. The code artifacts serve as the input for the downstream analysis of integration patterns and associated components.

At step 904, the process 900 may further include processing by the Aidap Code Analyzer 901, a self-learning, AI-driven engine trained on a wide array of technology datasets. The Aidap Code analyzer 901 may be configured to perform a multi-faceted examination of the input code including detection of technology and format, understanding of components and connectors, dataflow analysis, protocol identification, and endpoint recognition. Additionally, The Aidap Code analyzer 901 is configured to analyze runtime data to enhance context comprehension.

At step 906, the process 900 may include outputting the Aidap Code Analyzer feeds into the Aidap Integration Pattern Detector 903. The Aidap Integration Pattern Detector 903 is an AI-driven model trained on diverse integration patterns. The Aidap Integration Pattern Detector 903 may be configured to the most suitable integration pattern such as Point-to-Point, Publish/Subscribe, or Hub-and-Spoke based on the analyzed code and runtime data.

At step 908, the process 900 may further include suggesting detected integration pattern is suggested for the uploaded code. The recommendation supports several strategic objectives: enabling scalable and efficient architecture for greenfield developments, guiding modernization and re-platforming efforts in migration projects, and improving system efficiency and reliability by adopting best-fit integration models.

FIG. 10 illustrates a flowchart depicting a method 1000 for automated technology migration, according to an embodiment of the present disclosure.

At step 1002, the method 1000 may include receiving, the input, the source code associated with the source technology. The source code comprises the unstructured data and the structured data.

At step 1004, the method 1000 may include dynamically generating the target code associated with the target technology corresponding to the source code by transforming the unstructured data and the structured data into the target technology.

At step 1006, to transform the unstructured data, the method 1000 may generate the hierarchy of the unstructured data comprising the source set of nodes.

At step 1008, to transform the unstructured data, the method 1000 may include classifying, by the first machine learning model, each node among the source set of nodes into the corresponding category from among the plurality of predefined categories based on the semantic search.

At step 1010, In response to the classification, the method 1000 may include optimizing, by the Plurality of Machine Learning Models, the transformation of the source set of nodes into the target set of nodes associated with the target technology.

At step 1012, to transform the structured data, the method 1000 may include transforming the structured data into the self-evolving application model 316 using the hierarchical mapping module 320. The self-evolving application model 316 is trained and updated using the plurality of ML models based on at least one sample per unique variation of the source set of nodes.

One advantage of the present disclosure is that it provides a mechanism for performing technology migration by dynamically generating the target code corresponding to the source code that includes both the structured data and the unstructured data. The system 206 is configured to distinguish between these types and apply separate transformation paths using dedicated machine learning models trained for each category.

Another advantage of the present disclosure is that the unstructured data of the source code is transformed by first generating the hierarchy comprising the source set of nodes. In one embodiment, the hierarchy is generated by converting the unstructured data into XML format. The XML-based hierarchy maintains the logical flow, nesting structure, and execution dependencies from the original code, enabling context-preserving transformations and traceable downstream processing.

A further advantage is that each node among the source set of nodes is classified in parallel using the first ML model 314 based on a semantic search. The parallel classification allows for scalable processing across thousands of input nodes and supports high-throughput execution without dependency bottlenecks. Such a parallel execution improves transformation speed and enables distributed compute environments to be utilized effectively.

Yet another advantage of the present disclosure is that it optimizes transformation by transforming the plurality of nodes into the target technology with respect to the parallel classification and combining the transformed plurality of nodes to generate the unstructured data transformed into the target technology. This enables one-to-one, one-to-many, many-to-one, and many-to-many transformation patterns to be applied depending on the semantic content of each node, allowing for flexible and modular code generation.

Another advantage of the present disclosure is that the structured data is transformed into the self-evolving application model 316 using the hierarchical mapping module 320. The self-evolving application model 316 may be trained and updated using the plurality of ML models 318 based on at least one sample per unique variation of the source set of nodes. This sample-driven training strategy allows the model to generalize effectively even with sparse data availability and supports targeted adaptation to edge-case variations found in enterprise applications.

Furthermore, embodiments of the disclosed methods, processes, modules, devices, systems, and computer program products may be readily implemented, fully or partially, in software using, for example, object or object-oriented software development environments that provide portable source code that can be used on a variety of computer platforms. Alternatively, embodiments of the disclosed methods, processes, modules, devices, systems, and computer program products can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized.

In this application, unless specifically stated otherwise, the use of the singular includes the plural and the use of "or" means "and/or." Furthermore, use of the terms "including" or "having" is not limiting. Any range described herein will be understood to include the endpoints and all values between the endpoints. Features of the disclosed embodiments may be combined, rearranged, omitted, etc., within the scope of the present disclosure to produce additional embodiments. Furthermore, certain features may sometimes be used to advantage without a corresponding use of other features.

We claim:

1. A technology migration method, the method comprising:

receiving, as input, a source code associated with a source technology, wherein the source code comprises unstructured data and structured data; and dynamically generating a target code associated with a target technology corresponding to the source code by transforming the unstructured data and the structured data into the target technology, wherein the transforming the unstructured data comprises:

generating a hierarchy of the unstructured data comprising a source set of nodes;

classifying, by a first machine learning (ML) model, each node among the source set of nodes into a corresponding category from among a plurality of predefined categories based on a semantic search; and in response to the classification, optimizing, by a plurality of machine learning (ML) Models, transformation of the source set of nodes into a target set of nodes associated with the target technology; and wherein the transforming the structured data comprises:

transforming the structured data into a self-evolving application model using a hierarchical mapping module, and wherein the self-evolving application model is trained and updated using the plurality of ML models based on at least one sample per unique variation of the source set of nodes by:

obtaining the at least one sample to train the self-evolving application model in an intended technology;

identifying a format of the at least one sample using a format identifier ML model;

converting the at least one sample from the identified format into XML format using a conversion ML model;

analyzing the XML format of the at least one sample with respect to an existing version of the self-evolving application model to determine, one or more type of files in the at least one sample, one or more nodes associated with the one or more files and one or more relationships among the one or more nodes;

determining confidence scores corresponding to each of the one or more nodes associated with each of the one or more files and based on the determined one or more relationships;

obtaining user feedback when a consolidated confidence score is below a predefined threshold confidence score, wherein the consolidated confidence score is based on the corresponding scores; and training and updating the existing version of the self-evolving application model based on the user feedback, thereby refining the classification or the transformation to increase;

wherein the XML format preserves semantic meaning of the at least one sample from the identified format, while enabling structured parsing in the XML format.

2. The method of claim 1, wherein generating the hierarchy comprises:

generating the hierarchy by converting the unstructured data of the source code into extensible markup language (XML).

3. The method of claim 1, wherein classifying the hierarchy comprises:

parallelly classifying a plurality of nodes of the source set of nodes of the hierarchy of the unstructured data.

4. The method of claim 3, wherein optimizing the transformation comprises:

transforming the plurality of nodes into the target technology with respect to the parallel classification; and combining the transformed plurality of nodes to generate the unstructured data transformed into the target technology.

5. The method of claim 1, further comprising:

generating a mapping for the intended technology and a trained and updated version of the self-evolving application model.

6. The method of claim 1, prior to dynamically generating the target code, further comprising:

identifying, using predetermined ML techniques, one or more building blocks of the source code; and visualizing the source code for illustrating a relationship among the one or more building blocks.

7. The method of claim 6, further comprising:

identifying one or more integration patterns from a plurality of integration patterns based on the relationship among the one or more building blocks of the source code; and dynamically generating the target code based on one of the one or more identified integration patterns.

8. A system for technology migration, the system comprising:

a memory; and a processor coupled to the memory and configured to:

receive, as input, a source code associated with a source technology, wherein the source code comprises unstructured data and structured data; and dynamically generate a target code associated with a target technology corresponding to the source code by transforming the unstructured data and the structured data into the target technology, wherein to transform the unstructured data, the processor is configured to:

generate a hierarchy of the unstructured data comprising a source set of nodes;

classify, by a first machine learning (ML) model, each node among the source set of nodes into a corresponding category from among a plurality of predefined categories based on a semantic search; and in response to the classification, optimize, by a plurality of machine learning (ML) models, transformation of the source set of nodes into target set of nodes associated with the target technology; and wherein to transform the structured data, the processor is configured to:

transform the structured data into self-evolving application model using a hierarchical mapping module, and wherein the self-evolving application model is trained and updated using the plurality of ML models based on at least one sample per unique variation of the source set of nodes to:

obtain the at least one sample to train the self-evolving application model in an intended technology;

identify a format of the at least one sample using a format identifier ML model;

convert the at least one sample from the identified format into XML format using a conversion ML model;

analyze the XML format of the at least one sample with respect to an existing version of the self-evolving application model to determine, one or more type of files in the at least one sample, one or more nodes associated with the one or more files and one or more relationships among the one or more nodes;

determine confidence scores corresponding to each of the one or more nodes associated with each of the one or more files and based on the determined one or more relationships;

obtain user feedback when a consolidated confidence score is below a predefined threshold confidence score, wherein the consolidated confidence score is based on the corresponding scores; and train and update the existing version of the self-evolving application model based on the user feedback;

wherein the XML format preserves semantic meaning of the at least one sample from the identified format, while enabling structured parsing in the XML format.

9. The system of claim 8, wherein to generate the hierarchy, the processor is configured to:

convert the unstructured data of the source code into extensible markup language (XML).

10. The system of claim 8, wherein to classify the hierarchy, the processor is configured to:

parallelly classify a plurality of nodes of the source set of nodes of the hierarchy of the unstructured data.

11. The system of claim 10, wherein to optimize the transformation, the processor is configured to:

transform the plurality of nodes into the target technology with respect to the parallel classification; and combine the transformed plurality of nodes to generate the unstructured data transformed into the target technology.

12. The system of claim 8, wherein the processor is further configured to:

generate a mapping for the intended technology and a trained and updated version of the self-evolving application model.

13. The system of claim 8, prior to dynamically generate the target code, the processor is configured to:

identify, using predetermined ML techniques, one or more building blocks of the source code; and visualize the source code for illustrating a relationship among the one or more building blocks.

14. The system of claim 13, wherein the processor is further configured to:

identify one or more integration patterns from a plurality of integration patterns based on the relationship among the one or more building blocks of the source code; and dynamically generate the target code based on one of the one or more identified integration patterns.

* * * * *